Figure 1:
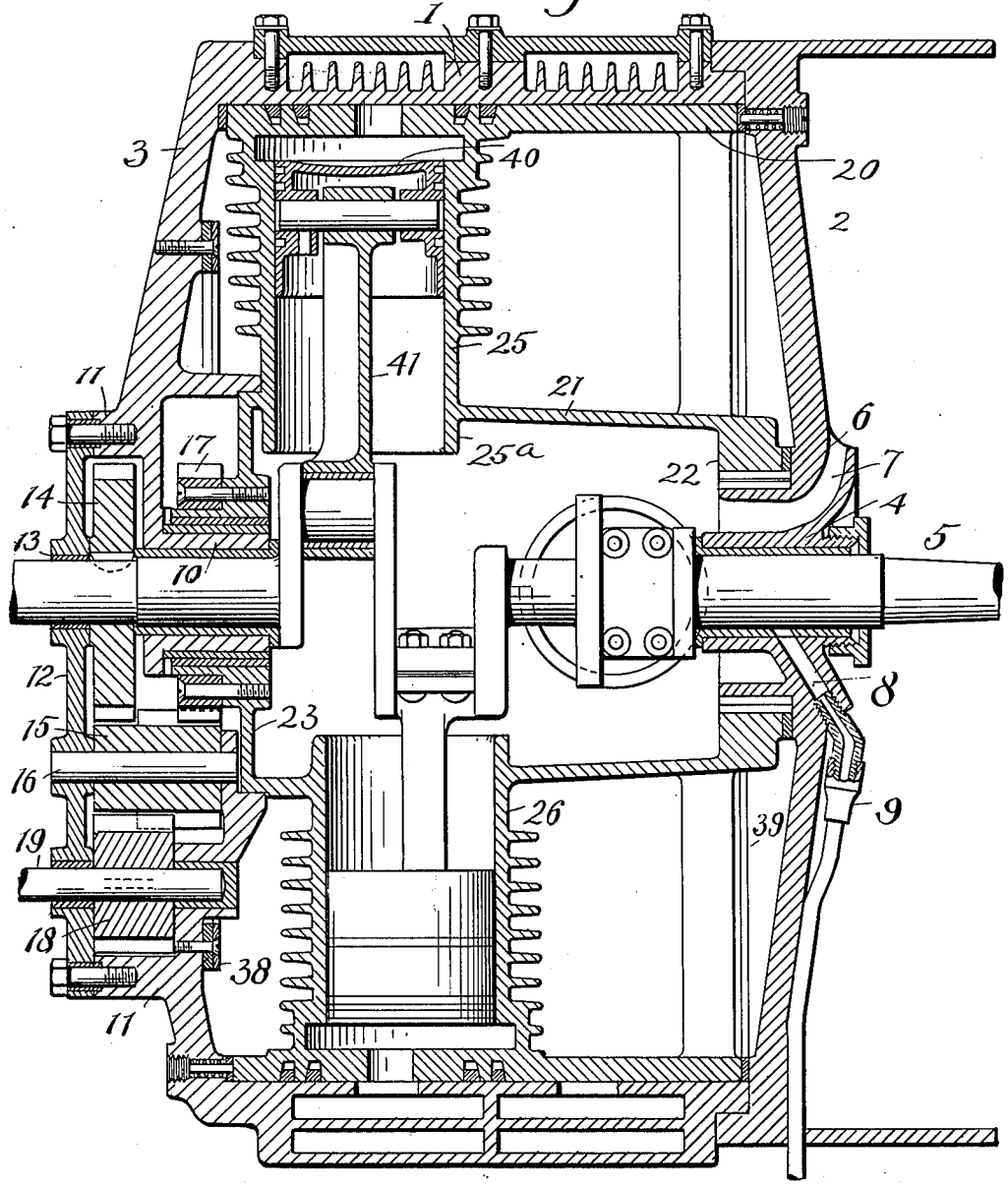

P. M. FREER.
INTERNAL COMBUSTION ENGINE.
APPLICATION FILED SEPT. 17, 1913. RENEWED JUNE 25, 1917.

1,292,295.

Patented Jan. 21, 1919.
4 SHEETS—SHEET 1.

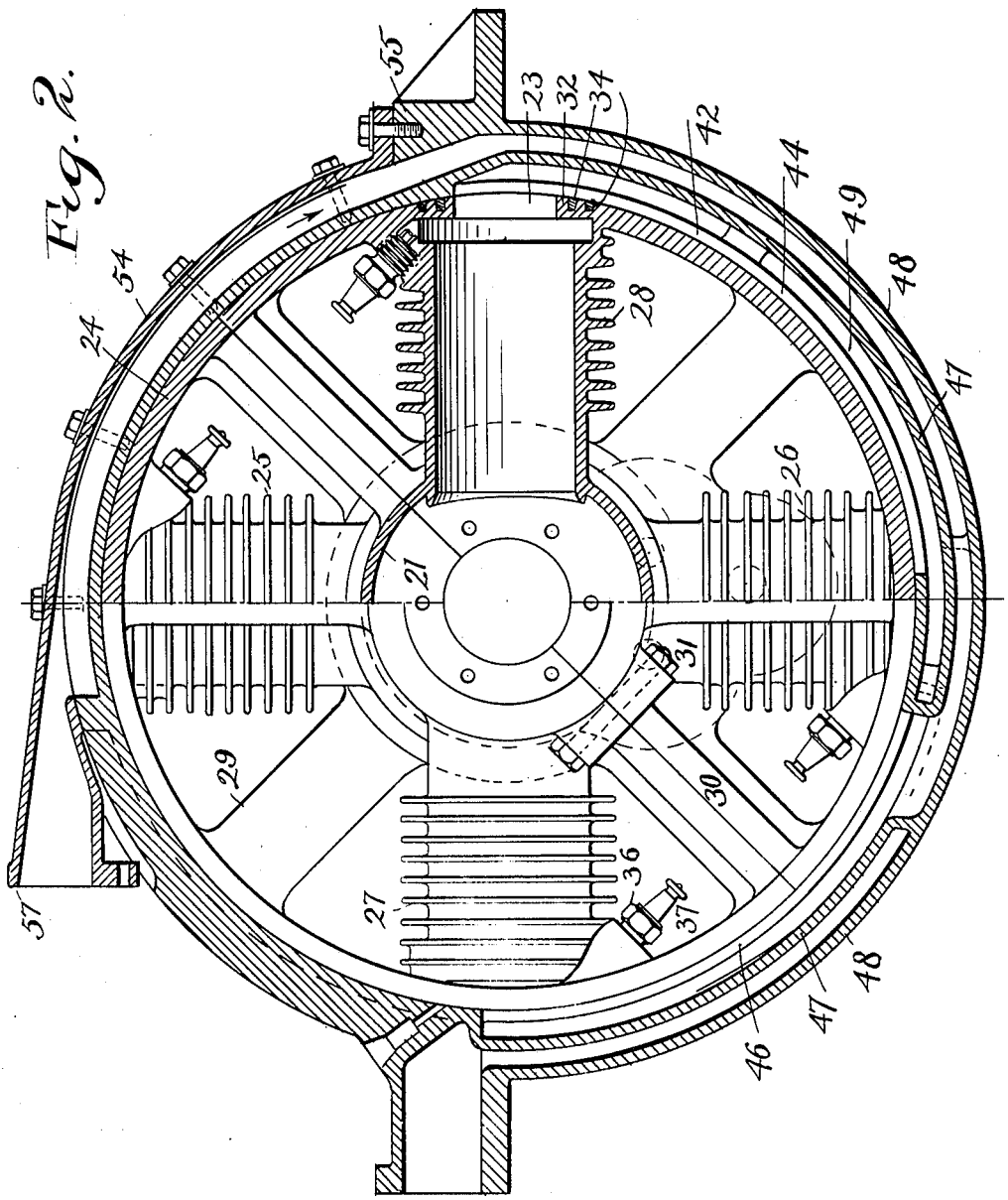

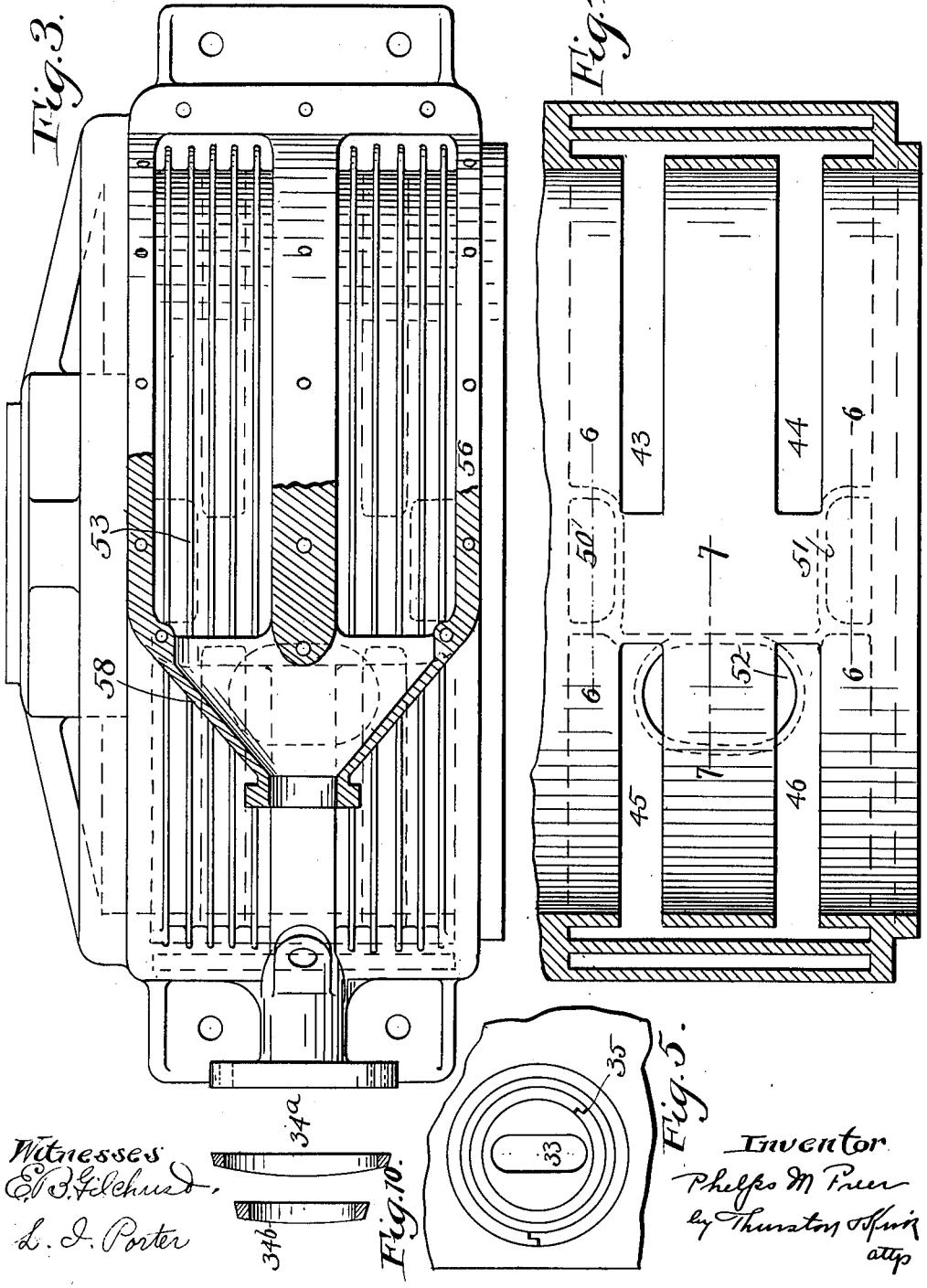

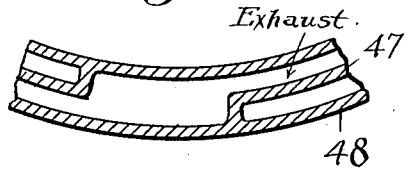
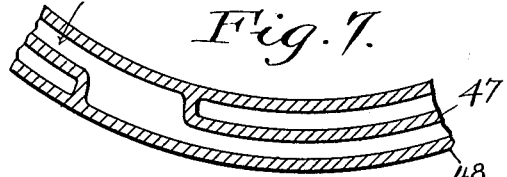
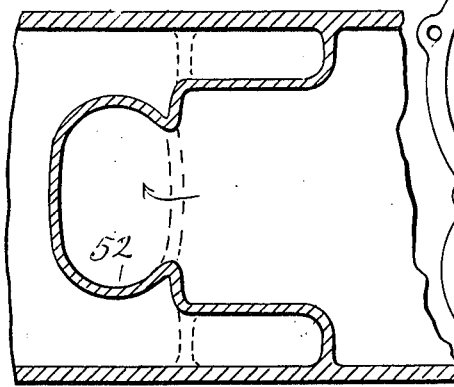
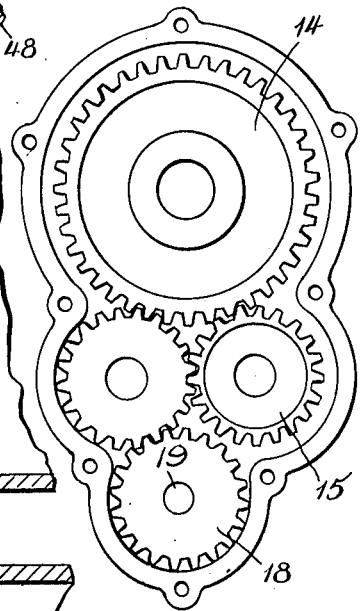
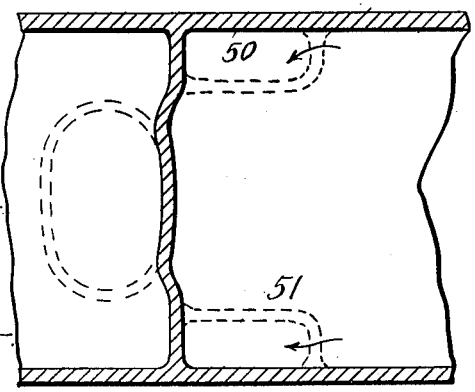

UNITED STATES PATENT OFFICE.

PHELPS M. FREER, OF DETROIT, MICHIGAN.

INTERNAL-COMBUSTION ENGINE.

1,292,295.  Specification of Letters Patent.  Patented Jan. 21, 1919.

Application filed September 17, 1913, Serial No. 790,162. Renewed June 25, 1917. Serial No. 176,923.

*To all whom it may concern:*

Be it known that I, PHELPS M. FREER, a citizen of the United States, residing at Detroit, in the county of Wayne and State of Michigan, have invented a certain new and useful Improvement in Internal-Combustion Engines, of which the following is a full, clear, and exact description.

This invention relates to rotary internal combustion engines.

The object of the invention is to provide an efficient engine of this type, and one in which the heating of the parts of the motor are controlled so that expansion in the various parts of the motor are equalized.

Furthermore, the invention consists in certain features of construction whereby the parts of the motor may be easily machined.

Generally speaking, the invention comprises the elements and combinations thereof set forth in the accompanying claims.

Reference should be had to the accompanying drawings forming a part of this specification, in which Figure 1 is a sectional elevation of the motor; Fig. 2 is a sectional elevation of the rotor at right angles to that shown in Fig. 1; Fig. 3 is a top plan view of the motor with certain parts in section; Fig. 4 is a plan view of the stator on a longitudinal section line; Fig. 5 is a plan view of the top of a cylinder; Fig. 6 is a section on the line 6—6 of Fig. 4; Fig. 7 is a sectional elevation of a portion on the line 7—7 in Fig. 4; Fig. 8 is a section and plan showing the partition wall in the top channel of the stator; and Fig. 9 is a section and plan showing the partition wall in the lower channel of the stator, Fig. 10 is a sectional elevation showing the packing rings; Fig. 11 shows the gearing connecting the crank shaft and rotor.

Referring to Fig. 1, the stator is indicated at 1 and comprises a cylindrical shell which is provided with end pieces 2 and 3, the same being suitably secured to the stator. The end piece 2 has a central opening which forms a bearing 4 for a crank shaft 5. Surrounding this bearing, and formed by an inwardly extending flange 6 of the side 2 is a bearing which supports one side of the rotor. Between this bearing and the bearing 4 is an opening 7, which provides an exit for the air passing through the rotor and stator.

Communicating with the bearing 4 is an inwardly extending duct 8 which is suitably connected with a pipe 9 for the purpose of lubricating the bearing.

The side 3 is provided with an inwardly extending flange 10 which forms a bearing for the other end of the crank shaft 5. The outside of this flange also forms a bearing for one end of the rotor.

The side 3 is provided with an extending flange 11, which forms a gear casing or housing, to which is secured a plate 12. This plate is provided with an opening 13 through which extends the shaft 5, and upon the shaft, secured thereto, within the cover 12 is a gear 14. This meshes with a gear 15, mounted upon a shaft 16, which shaft is supported at one end in the cover 12, and at the opposite end in a bearing formed in the inner wall of the end piece 3.

Upon the outer side of the rotor is a gear 17, which meshes with the gear 15. It will therefore be apparent that there is a driving connection between the rotor and the crank shaft, through the gears 17, 15 and 14.

In the lower part of the gear casing which is formed between the inner wall of the end piece 3 and the cover 12, is a gear 18, which is secured upon a shaft 19, the shaft being mounted at one end in the cover 12, and at its opposite end in the inner wall of the end piece 3. This gear meshes with the teeth on the gear 15 and will be rotated by it. The function of the gear 18 is to pump oil which accumulates in the lower part of the gear casing through an opening, not shown, from which opening it is conveyed to a suitable storing receptacle, to be again supplied for lubricating the moving parts of the motor.

The rotor may be generally designated at 20, and is more particularly shown in Fig. 2. It consists of a central hollow hub 21, which is slightly tapered from the end adjacent the side piece, 2, toward the side piece 3,—the diameter being greatest at that portion toward the side 3. The wall of the hub is provided with an inwardly extending flange 22 which rests upon the flange 6 of the side piece 2, to form a bearing for the rotor 20. At its opposite end the hub of the rotor is provided with an inwardly extending flange 23, which engages with the inwardly extending flange 10 of the side 3 and forms the second bearing for the rotor. The outer part of the rotor is formed by a two-part annular rim-like member indicated at 24, and the rim and hub are joined by two oppositely disposed cylinders 25, 26, and two other cylinders 27 and 28, which are dispposed at right angles to the cylinders just mentioned.

Intermediate of the cylinders are radiating spokes indicated at 29. These spokes extend from the hub to the rim of the rotor. The rotor is split or made in two parts,— the line of division being shown at 30 in Fig. 2. It will be noted that the rotor is split so as to be joined along two of the spokes and the halves are suitably joined together by means of bolts such as indicated at 31.

By making the rotor in two parts and dividing it as indicated in Fig. 2, it is possible to machine the cylinders with comparative ease. And further this construction permits the hub cylinders and rim in each half of the rotor to be cast integral.

Another feature permitted by the construction just described is in providing the end of each cylinder with a solid head as indicated at 32. With the divided construction of the rotor it is possible to machine the cylinders from inside and thus allow the outer head of the cylinder to be solid.

The solid head of each cylinder is provided with a slot 33 which is elongated, as indicated in Fig. 5. Around the slot 33 in each head are concentric grooves 34. These grooves are formed so that one side is substantially parallel with the wall of the cylinder, while the other side is slanted with respect thereto. In the instance shown the side which is nearest to the slot is straight and the slanted side is farthest from the slot. Within each of the grooves shown is a ring which is indicated at 34$^a$ and 34$^b$. These rings are split as indicated at 35 in Fig. 5,—the adjacent ends of each ring being notched with a right angular recess and the projecting portions of each end of the ring formed by the notching being adapted to overlie. The rings are so constructed as to tend to ride up the inclined surfaces of the grooves in which they are placed and so produce a tight engagement with the surface of the stator as the cylinder rotates therein.

Each of the cylinders is provided with a threaded opening 36 which communicates with the interior of the cylinder,—these openings 36 being adapted to receive spark plugs, one of which is indicated at 37. The manner in which these spark plugs are energized is immaterial so far as this invention is concerned, but, in passing, it may be stated that conducting rings 38 and 39 are secured upon opposite sides of the stator and are in such position that brushes carried by the spark plugs may be wiped along these respective rings and thus cause the spark plugs to function at proper times and ignite the mixture within the cylinders.

Within the cylinders are pistons, one of which is indicated at 40 in Fig. 1. These pistons are by means of suitable piston rods 41 operatively connected with an appropriate part of the crank shaft 5.

Attention is called to the fact that the cylinders are provided with extending flanges 25$^a$ which extend inwardly from the crank casing 21. In this manner the oil which collects in the crank casing 21 is prevented from finding its way into the cylinders, and thus prevents carbonizing of the cylinders from this source.

The stator comprises an annular cylindrical portion indicated at 42. This portion 42 is provided with two exhaust ports 43 and 44,—which extend upon the stator an arcual distance of a little over 90 degrees. The two exhaust ports are properly spaced so as to coöperate with the openings in the end of cylinders 27, 28 and 25, 26.

The portion 42 of the stator is also provided with intake ports 45, 46,—these intake portions extending through arcual distances substantially 90 degrees of the stator,—there being as short an interval as possible between the end of the exhaust ports and the beginning of the intake ports.

Through that portion of the stator adjacent the exhaust and the intake ports there is an intermediate partition or wall 47, and an outer wall 48, these various walls being spaced from each other by means of suitable blocks or spacers 49. The space between the partition 47 and the inner wall 42 of the stator which is adjacent the exhaust port 42 is for the purpose of conducting the exhaust gases, while the space between the inner wall 46 and the intermediate wall 47 which is adjacent the intake port is for the purpose of conducting fuel supply.

The space between the wall 47 and the wall 48 which is below the exhaust port surface serves as a means for conducting fuel supply prior to its introduction at the intake port, and the space between the walls 47 and 48 which is beneath the intake port serves to conduct the exhaust gases just previous to their being expelled from the stator.

Through the intermediate wall 47 there are openings 50 and 51 which are placed toward the sides of the stator. One of these openings is more particularly shown in Fig. 6, and through this opening it will be seen that the space between the walls 42 and 47 may communicate with the space between the walls 47 and 48. This opening is so placed as to be close to the lower extremity of the exhaust port to which it is adjacent so that the exhaust gases will pass from the upper channel to the lower channel, which channel is between the walls 47 and 48 at the portion thereof which is below the intake ports.

The intermediate wall 47 is also provided with an opening 52, which is located substantially in the central plane of the stator and beyond the openings 50 and 51. This opening permits the gases passing between the walls 47 and 48 beneath the exhaust port to pass to the passageway between the walls 46 and 47 adjacent the intake port.

As will be seen by reference to Fig. 6, the opening 51 is walled above and below the walls 47 so as to direct the gases which may be flowing from the upper channel into the lower channel, and in Fig. 7 it will be seen that the opening 52 is also walled above and below the intermediate partition 47 so that the gases flowing in the lower channel will be directed to the upper channel.

The outline of the walls in the lower channel will be seen in Fig. 8 and the outline of the walls in the upper channel will be seen in Fig. 9, and in Fig. 8 is shown in dotted lines the completion of the walls as shown in Fig. 9. It will be seen, therefore, from the foregoing that the exhaust gases passing between the walls 42 and 47 will pass through the opening 51 and 50 to the lower channel between the walls 47 and 48 and pass outside of the channel between the walls 42 and 47 which is conducting the fuel mixture, while the fuel mixture in the first instance is conducted through the passageway between the walls 47 and 48, which passageway surrounds that passageway between the walls 47 and 42 which is conducting the exhaust gases.

The upper part of the stator body is provided with ribs which are indicated at 53 in Fig. 3 and coöperating with a portion of the upper part of the stator is a casing 54. This casing at one end is secured upon a supporting rib projecting from the stator, indicated at 55 and at the sides is secured upon the outer rim portions of the stator, as indicated at 56 in Fig. 3.

This casing 54 is provided at one end with a flaring bell mouth 57 which is adapted to carry a carbureter. The mouth 57 spreads, as indicated at 58 in Fig. 3, so as to communicate with the space between the ribs 53 and, in so spreading, the fuel supply passing through the portion 57 will be equally distributed throughout the various channels formed by the ribs 53.

The space between the ribs 53 eventually communicates with the channel between the walls 47 and 48, so that the fuel supply passing through the intake 57 will distribute itself over the outside of the stator as it passes between the stator and the casing 54. Then it will continue its flow through the channel which is beneath the channel conducting the exhaust gases and subsequently passes to the upper channel to the intake ports of the engine.

All this construction and passage of the gases is for a two fold purpose. First, to equalize the heating of the stator, and rotor, and, in the second place, to provide a preheating of the fuel gases. It will be quite evident that after a given cylinder has passed the intake port and the gases are being compressed that there is considerable heat developed. This, followed by the explosion, develops more heat. Therefore the upper part of the stator will be subjected to a greater amount of heat than will be the lower part, for in the lower part of the stator are the exhaust and intake ports, and during the time that the cylinder is in communication with these ports no heat is being generated at these portions.

This unequal heating has a tendency to cause the rotor and stator to bind. Therefore, it is of importance in this type of engine to so far as possible provide for an equal distribution of heat throughout the stator and thus avoids this difficulty.

The carbureted air as it comes to the casing 54 is cool, and in the construction shown it passes over the hottest part of the stator, thereby cooling the stator to a certain extent. These gases, as they continue, pass outside of the exhaust gases and so probably absorb more heat and therefore at the time when they reach the portion of the stator which is provided with the intake ports the gases will heat this portion of the stator, thus tending to equalize the heat throughout the stator.

The exhaust gases as they pass outside of the fuel gases at the time the fuel gases are at the intake port will protect these fuel gases against radiation of heat, and thus assist in heating that portion of the stator which is adjacent the intake ports, and so effect a more even distribution of the heat.

Furthermore it will be observed that the heating of the fuel gases materially assist in perfect combustion of the gases, and will eliminate trouble which might arise by supplying the gas directly from the carbureter to the cylinders, due to the varying temperature of the gas mixture supply.

The preheating of the fuel in the manner described and illustrated may be utilized upon other types of engines than that herein shown, and I do not limit myself to the exact form shown.

Having described my invention, what I claim is:

1. In an internal combustion engine, a rotor member carrying one or more cylinders, a stator member, an inlet port and exhaust port formed in said stator, a conduit extending along the stator from the exhaust port for conducting away the exhaust gases, a conduit extending along the stator for conducting fuel to the inlet, a conduit communicating with the second mentioned conduit and extending upon the outside of the first mentioned conduit whereby incoming fuel absorbs heat from the outgoing products of combustion, a conduit communicating with the first mentioned conduit and extending upon the outside of the second mentioned conduit from which last mentioned means the products of combustion are discharged.

2. In an internal combustion engine, the combination with a rotor member having one or more cylinders, of a stator member, an exhaust port and an intake port in said stator, a conduit extending along the stator from the exhaust port for conducting away the exhaust gases, a second conduit extending along the stator for conducting fuel to the inlet port, a third conduit communicating with the second mentioned conduit and extending upon the outside of the first mentioned conduit, a fourth conduit communicating with the first mentioned conduit and extending upon the outside of the second mentioned conduit.

3. In an internal combustion engine, the combination with a stator and a rotor member, one or more cylinders carried by the rotor, an exhaust port and an intake port formed in said stator, a conduit extending along the stator from the exhaust port for conducting away the exhaust gases, a second conduit extending along the stator for conducting fuel to the inlet port, a third conduit communicating with the first mentioned conduit and extending upon the outside of the second mentioned conduit, a third conduit communicating with the second conduit extending upon the outside of the first mentioned conduit, and extending in contact with the outside of the stator through that portion traversed by the cylinder during the explosion of the gases therein.

4. In an internal combustion engine, the combination with a stator and rotor member, one or more cylinders carried by said rotor, an exhaust port and an intake port formed in said stator, a conduit for exhaust gases adjacent the exhaust port and a conduit for fresh fuel gases adjacent the intake port, said last named conduit extending in contact with the first named conduit adjacent the exhaust port and beyond said exhaust port conduit in contact with the outside of the stator through that portion traversed by the cylinder during the explosion of the gases therein.

5. In an internal combustion engine, the combination with a rotor and stator, said rotor being provided with one or more cylinders, intake and exhaust ports formed in the stator, a conduit adjacent the exhaust port for conducting the gases therefrom, a conduit adjacent the intake port and a conduit extending in contact with the outside of the stator through that portion traversed by the cylinder during the explosion of the gases therein, and outside the conduit adjacent the exhaust port and communicating with the conduit adjacent the intake port.

6. In an internal combustion engine, the combination with a rotor having a cylinder and a stator, an exhaust port formed in the stator and an intake port formed in the stator, two overlying conduits formed in the wall of said stator adjacent the inlet and outlet ports, the inner conduit adjacent the exhaust port being connected with the outer conduit which is adjacent the intake port, and the inner conduit adjacent the intake port being connected with the outer conduit adjacent the exhaust port.

7. In an internal combustion engine, the combination with a rotor having a cylinder and a stator, an exhaust port formed in the stator and an intake port formed in the stator, two overlying conduits formed in the wall of said stator adjacent the inlet and outlet ports, the inner conduit adjacent the exhaust port being connected with the outer conduit which is adjacent the intake port, and the inner conduit adjacent the intake port being connected with the outer conduit adjacent the exhaust port, and a conduit communicating with the outer conduit which is adjacent the exhaust port, said conduit extending around the outside of said stator through that portion which is traversed by the cylinder previous to and during the explosion of the fuel within the cylinder.

8. In an internal combustion engine, the combination with a rotor member provided with a cylinder and a stator member, ribs formed upon the upper portion of said stator throughout that portion traversed by the cylinder during the explosion of the gases therein, a cover secured to the stator and overlying said ribs, an opening in said cover for admitting fuel supply, said stator being provided with inlet and outlet ports, a conduit connecting with the last mentioned conduit and also connecting with the space beneath the cover before mentioned.

9. In an internal combustion engine, the combination with a rotor having a cylinder, of a stator, an inlet port and an outlet port occupying adjacent quadrants of said stator, a chambered portion formed in the wall of said stator which is adjacent the said ports, a central partition in said chambered portion, two openings in said central partition member, a wall between the central partition member and the inner wall of the chambered portion of the stator, and a wall between the central partition member and the outer portion of the stator, said ports and walls being arranged such that gases passing through the inner part of the chambered portion will be transferred to the outer part of the chambered portion, and vice versa.

10. In an internal combustion engine, the combination with a stator provided with inlet and outlet ports, of a rotor member comprising a hub portion and a rim portion, cylinders extending between the hub and the rim, spokes extending from the hub to the rim and staggered with respect to the cylinders, said rotor being formed in a plurality of parts on planes which pass through certain of the spokes, and means for securing parts of the rotor together.

11. In an internal combustion engine, a rotor member carrying one or more cylinders, a stator member with which the rotor member coöperates, an intake port and an exhaust port formed in the stator, a conduit in the stator through which incoming fuel passes coöperating with the intake port, said conduit extending upon the stator through a region of the stator which is highly heated in the operation of the engine, a second conduit in the stator through which exhaust gases pass coöperating with the exhaust port, said second conduit extending upon the stator through a region of the stator which is not so highly heated in the operation of the engine as the first mentioned region, whereby the walls of the stator are maintained at substantially equal temperatures.

12. In an internal combustion engine, a rotor member carrying one or more cylinders, a stator member with which said rotor member coöperates, an intake port, an exhaust port formed in said stator, the said stator having passage ways, one of which communicates with the exhaust port, the other of which communicates with the intake port, said passage ways crossing each other, so that part of the passage way to the intake port lies upon the outside of a portion of the exhaust passage way and a portion of the exhaust passage way lies upon the outside of a portion of the intake passage way.

13. In an internal combustion engine, a rotor member carrying one or more cylinders, a stator member with which said rotor member coöperates, and forms the closure for the said cylinders, an exhaust port formed in the stator, an intake port formed in the stator, means for conducting incoming fuel about that portion of the stator, at which compression and ignition of a charge in the cylinder takes place, and finally delivering the same to the intake port.

14. In an internal combustion engine, a rotor member carrying one or more cylinders, a stator member with which the rotor member coöperates forming a closure for the outer end of the cylinder or cylinders, an exhaust port formed in the stator, an intake port formed in the stator, means forming a conduit extending in contact with that portion of the stator at which compression of a charge in the cylinder and ignition and expansion of the charge in the cylinder takes place thereby cooling that portion of the stator, said conduit means connecting with the intake port.

15. In an internal combustion engine, a rotor member carrying one or more cylinders, a stator member with which the rotor member coöperates forming a closure for the end of the cylinder or cylinders, an exhaust port formed in the stator, an intake formed in the stator, a conduit in the stator which connects with the intake port said conduit extending along that portion of the stator wherein a charge of gas is compressed within the cylinder and wherein the gas is ignited and expands whereby the cool intake fuel is brought into contact with a hot part of the stator.

In testimony whereof, I hereunto affix my signature in the presence of two witnesses.

PHELPS M. FREER.

Witnesses:
 JOHN H. STEIN,
 F. J. FREEMAN.